(12) United States Patent
Lee

(10) Patent No.: US 8,864,330 B2
(45) Date of Patent: Oct. 21, 2014

(54) BACK LIGHT UNIT AND LIQUID CRYSTAL DISPLAY MODULE USING THE SAME

(75) Inventor: Sang Jun Lee, Seongnam-si (KR)

(73) Assignee: Cobbler Applications LLC, Dover, DE (US)

( * ) Notice: Subject to any disclaimer, the term of this patent is extended or adjusted under 35 U.S.C. 154(b) by 754 days.

(21) Appl. No.: 12/594,878

(22) PCT Filed: Mar. 19, 2008

(86) PCT No.: PCT/KR2008/001541
§ 371 (c)(1),
(2), (4) Date: Oct. 6, 2009

(87) PCT Pub. No.: WO2008/126990
PCT Pub. Date: Oct. 23, 2008

(65) Prior Publication Data
US 2010/0118513 A1 May 13, 2010

(30) Foreign Application Priority Data

Apr. 13, 2007 (KR) .......................... 10-2007-0036553

(51) Int. Cl.
*G02B 6/04* (2006.01)
*G02F 1/1335* (2006.01)

(52) U.S. Cl.
CPC ............ *G02F 1/133606* (2013.01); *G02F 2001/133607* (2013.01); *G02F 1/133604* (2013.01); *G02F 1/133504* (2013.01)
USPC ...................................................... 362/97.2

(58) Field of Classification Search
CPC ............................................. G02F 1/133611
USPC .............. 362/97.1, 330, 97.2, 97.4, 223, 224
See application file for complete search history.

(56) References Cited

U.S. PATENT DOCUMENTS 5,899,552 A * 5/1999 Yokoyama et al. ............ 362/619
7,030,546 B2 * 4/2006 Han et al. ...................... 313/402
(Continued)

FOREIGN PATENT DOCUMENTS

JP 2002-196312 7/2002
JP 2004319122 11/2004
(Continued)

OTHER PUBLICATIONS

PCT International Search Report of Int'l Application No. PCT/KR2008/001541 filed on Mar. 19, 2008.
JP 2007328322; English translation of abstract; Nov. 14, 2007; 2 pages.

*Primary Examiner* — Jong-Suk (James) Lee
*Assistant Examiner* — Leah S Macchiarolo
(74) *Attorney, Agent, or Firm* — Stolowitz Ford Cowger LLP

(57) ABSTRACT

A back light unit capable of achieving a reduction in thickness and manufacturing costs is disclosed. The back light unit includes light sources arranged in parallel, to emit light, a case receiving the light sources, a diffuser plate diffusing the light from the light sources, condensers laminated on the diffuser plate and having predetermined thicknesses, and a diffuser interposed between the adjacent condensers. The distance from the lamps to the diffuser plate is reduced by the diffuser plate and the optical sheets (three or four sheets) laminated over the diffuser plate, to reduce the total thickness of the back light unit. Also, the number of lamps is reduced by 2 to 4, as compared to the conventional back light unit, so that the manufacturing costs of the back light unit is reduced. The brightness difference exhibited on the display screen is also reduced, so that a brightness uniformity is achieved.

12 Claims, 8 Drawing Sheets

(56) References Cited

U.S. PATENT DOCUMENTS

| | | | |
|---|---|---|---|
| 7,344,282 B2 * | 3/2008 | Kim et al. | 362/335 |
| 7,397,522 B2 | 7/2008 | Lee et al. | |
| 7,766,528 B2 * | 8/2010 | Epstein et al. | 362/609 |
| 2003/0081402 A1 * | 5/2003 | Jeon et al. | 362/26 |
| 2006/0221273 A1 * | 10/2006 | Ha et al. | 349/65 |
| 2006/0262555 A1 * | 11/2006 | Yi et al. | 362/561 |
| 2008/0303975 A1 | 12/2008 | Mizuno et al. | |

FOREIGN PATENT DOCUMENTS

| | | |
|---|---|---|
| JP | 2006-351540 | 12/2006 |
| JP | 2007-004104 | 1/2007 |
| JP | 2007-059122 | 3/2007 |
| JP | 2007328322 | 11/2007 |

\* cited by examiner

Base Film Thickness 188 μm + Pattern Thickness 25 μm = 213 μm (Seat Thickness)
Base Film Thickness 250 μm + Pattern Thickness 25 μm = 275 μm (Seat Thickness)

BACK LIGHT UNIT AND LIQUID CRYSTAL DISPLAY MODULE USING THE SAME

TECHNICAL FIELD

The present invention relates to a back light unit and a liquid crystal display module using the same, and more particularly, to a back light unit capable of achieving a reduction in thickness and a reduction in manufacturing costs, and a liquid crystal display module using the same.

BACKGROUND ART

Recently, various flat panel display devices have been developed which can eliminate disadvantages of cathode ray tubes (CRTs) caused by bulky and heavy structures thereof. Such flat panel display devices include a liquid crystal display (LCD), a field emission display (FED), a plasma display panel (PDP), and a light emitting display (LED).

Recently, the importance of display devices as visual information media has been emphasized, so various flat panel display devices have been developed.

Such flat panel display devices include a liquid crystal display (LCD), a field emission display (FED), a plasma display panel (PDP), an electroluminescence (EL), etc.

Of such flat panel display devices, the LCD exhibits an expanded application range by virtue of lightness, thinness, low power consumption, etc. In accordance with the expanded application range, the LCD is used for a portable computer such as a notebook PC, an office automation appliance, an audio/video appliance, an indoor/outdoor advertising display, etc. The LCD has also been rapidly developed toward a large size and a high resolution, by virtue of the development of techniques for mass production and the results of research and development.

A general LCD device includes an LCD module, and a driving circuit for driving the LCD module.

In detail, the LCD device includes a liquid crystal panel having liquid crystal cells arranged in the form of a matrix between two glass substrates, a back light unit for irradiating light to the liquid crystal panel, and a driving circuit for driving the liquid crystal panel and back light unit.

In the LCD module, a plurality of optical sheets are arranged to change the travel direction of light traveling from the back light unit toward the liquid crystal panel such that the light is directed in a direction perpendicular to the liquid crystal panel. The liquid crystal panel, back light unit, and optical sheets should be coupled together to form an integrated structure, in order to avoid optical loss. They should also be protected from damage caused by an external impact. To this end, a case for the LCD device, which is formed to enclose the periphery of the liquid crystal panel, back light unit, and optical sheets, is provided.

FIG. 1 is a cross-sectional view illustrating a general LCD module using a direct type back light unit.

Referring to FIG. 1, the back light unit 10 of the LCD device includes a plurality of lamps 30 for irradiating light to a liquid crystal panel (not shown) as a display screen, a diffuser plate 40 for diffusing the light incident from the lamps 30, thereby causing the diffused light to be irradiated to the liquid crystal panel, a lamp housing 20 arranged at the backside of the lamps 30, and a plurality of optical sheets 50 laminated on the diffuser plate 40.

For each lamp 30, a cold cathode fluorescent lamp is mainly used. Each lamp 30 includes a glass tube, an inert gas contained in the glass tube, and a cathode and an anode respectively mounted to opposite ends of the glass tube. Light emitted from each lamp 30 is incident to the diffuser plate 40.

The number of required lamps 30 increases in proportion to the size of the display screen. In the case of an LCD device having a screen size of 40 to 42 inches, 14 to 16 lamps are mounted. Also, the lamps 30 are arranged such that the adjacent lamps 30 are spaced apart from each other by a distance "W1 (22 mm)".

In the lamp housing 20, a reflection sheet or a reflection plate is mounted to reflect light toward the diffuser plate 40. The lamps 30 are also mounted in the lamp housing 20. The reflection sheet or reflection plate is made of a material capable of reflecting light. The reflection sheet or reflection plate is formed to correspond to the bottom surface and inclined side surfaces of the lamp housing 20. Accordingly, the reflection sheet or reflection plate reflects light toward the diffuser plate 40, thereby enhancing the efficiency of light irradiated to the liquid crystal panel. Here, the lamp housing means a bottom chassis of the LCD device.

The diffuser plate 40 causes incident light from the lamps 30 to be directed to the front of the display surface while diffusing the light such that the light is uniformly distributed over a wide range. The diffuser plate 40 irradiates the diffused light to the liquid crystal panel.

The light emitted from each lamp 30 is incident to the display screen via the diffuser plate 40 and optical sheets 50. The light emerging from the diffuser plate 40 is diffused light having a large viewing angle. The light incident to the display screen exhibits an increased light efficiency when it is perpendicular to the display screen. In order to enhance the efficiency of the light emerging from the diffuser plate 40, a plurality of optical sheets 50 are arranged on the diffuser plate 40.

FIG. 2 is an enlarged sectional view of a part of the back light unit shown in FIG. 1.

Referring to FIG. 2, the plurality of optical sheets 50, for example, first to third optical sheets, change the direction of the light emerging from the diffuser plate 40 such that the light is directed in a direction perpendicular to a display screen, to achieve an enhancement in light efficiency. To this end, the back light unit includes a first diffuser sheet 52 for diffusing light emerging from the diffuser plate 40 over the overall region of the display screen, a prism sheet 54 for changing the traveling angle of the light diffused by the first diffuser sheet 52 such that the diffused light is directed in a direction perpendicular to the display screen, and a second diffuser sheet 56 for diffusing the light emerging from the prism sheet 54 over the overall region of the liquid crystal panel while enhancing the efficiency of the light.

The second optical sheet may be substituted by a diffuser sheet. If necessary, the third optical sheet may be substituted by a dual brightness enhancement film (DBEF), in order to achieve a further increase in brightness. Accordingly, the light emerging from the diffuser plate 40 is incident to the display screen via the plurality of optical sheets 50.

However, the conventional back light unit 10, which has a general configuration as described above, requires a certain distance from the plurality of lamps 30 to the diffuser plate 40, in order to obtain a uniform brightness at the display screen.

As shown in FIG. 1, the conventional back light unit 10 has a large thickness "d1 (37 mm)" because the distance from the plurality of lamps 30 to the diffuser plate 40 is long. Since the back light unit 10 has a large thickness of 37 mm, there is a drawback in terms of an important factor of the flat panel display device, namely, thinness.

In addition, although the conventional back light unit 10 uses a plurality of optical sheets 50 to achieve an enhancement in the uniformity of light irradiated to the display screen, a brightness difference corresponding to a value "A" is generated on the display screen because the brightness at a portion of the display screen arranged directly over each lamp 30 is high, whereas the brightness at a portion of the display screen arranged between the adjacent lamps 30 is low, as shown in FIG. 3. Such a brightness difference causes a degradation in the display quality of the display device.

In order to reduce the brightness difference, it is necessary to increase the distance from the plurality of lamps 30 to the diffuser plate 40. In this case, however, the LCD device has a further increased thickness. Meanwhile, an auxiliary light source may be mounted between the adjacent lamps, to achieve an enhancement in brightness uniformity. In this case, however, an increase in manufacturing costs occurs because the total number of light sources increases due to the provision of the auxiliary light source.

DISCLOSURE

Technical Problem

It is an object of the present invention is to provide a back light unit having a reduced thickness without a degradation in brightness. Another object of the present invention is to provide a liquid crystal display device which achieves an enhancement in display quality, using the back light unit. Still another object of the present invention is to provide a liquid crystal display device which achieves a reduction in manufacturing costs, using the back light unit.

Technical Solution

In one aspect of the present invention, a back light unit comprises: a plurality of light sources arranged in parallel, to emit light; a case for receiving the light sources; a diffuser plate for diffusing the light from the light sources; a plurality of condensers laminated on the diffuser plate, the condensers having predetermined thicknesses, respectively; and a diffuser interposed between adjacent ones of the condensers.

In another aspect of the present invention, a back light unit comprises: a plurality of light sources arranged in parallel, to emit light; a case for receiving the light sources; a diffuser plate arranged to cover a front side of the case opposite to the light sources, the diffuser plate diffusing the light from the light sources; a first condenser arranged on the diffuser plate, to condense the light emerging from the diffuser plate; a first diffuser arranged on the first condenser, to diffuse the condensed light; a second condenser arranged on the first diffuser, to re-condense the light diffused by the first diffuser; and a second diffuser arranged on the second condenser, to re-diffuse the re-condensed light.

In still another aspect of the present invention, a back light unit comprises: a plurality of light sources arranged in parallel, to emit light; a case for receiving the light sources; a diffuser plate arranged to cover a front side of the case opposite to the light sources, the diffuser plate diffusing the light from the light sources; a first condenser arranged on the diffuser plate, to condense the light emerging from the diffuser plate; a first diffuser arranged on the first condenser, to diffuse the light condensed by the first condenser; a second condenser arranged on the first diffuser, to re-condense the light diffused by the first diffuser; and a reflective polarizer arranged on the second condenser, to selectively polarize light received from the second condenser.

Advantageous Effects

In the back light unit according to an embodiment of the present invention, it is possible to reduce the distance from the lamps to the diffuser plate, using the diffuser plate and the optical sheets (three or four sheets) sequentially laminated over the diffuser plate, as described above, and thus to reduce the total thickness of the back light unit. Accordingly, it is possible to reduce the total thickness of the back light unit, and thus to reduce the total thickness of the display device.

Also, the number of lamps mounted in the back light unit according to the embodiment of the present invention is reduced by 2 to 4, as compared to that of the conventional back light unit. Accordingly, it is possible to reduce the manufacturing costs of the back light unit.

Although the thickness and the number of lamps in the back light unit according to the embodiment of the present invention is reduced by 20 mm and 2 to 4, respectively, as compared to the conventional case, the brightness difference exhibited on the display screen is reduced. Accordingly, it is possible to achieve a brightness uniformity, and thus to achieve an enhancement in the display quality of the display device.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Hereinafter, preferred embodiments of the present invention will be described with reference to the accompanying drawings.

Figure 4:
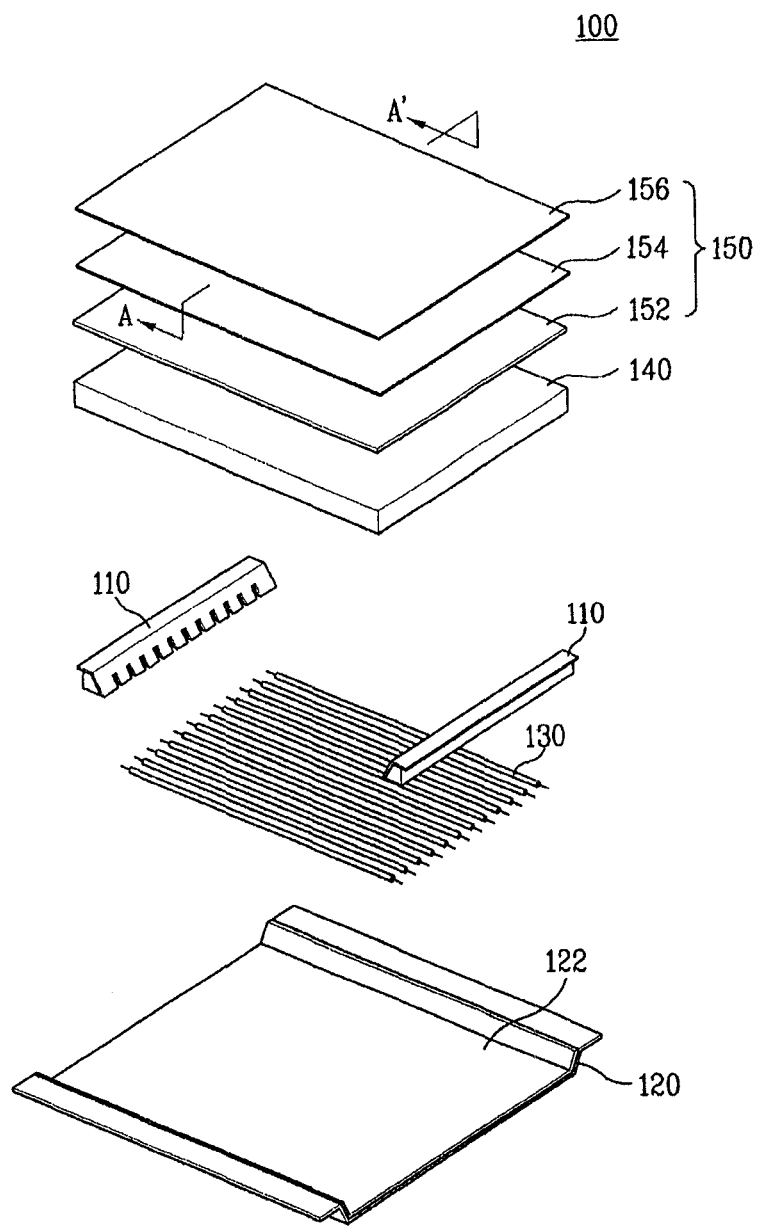
FIG. 4 is an exploded perspective view illustrating a back light unit according to a first embodiment of the present invention.

FIG. 4 is an exploded perspective view illustrating a back light unit according to a first embodiment of the present invention.

Referring to FIG. 4, the back light unit 100 according to the first embodiment of the present invention includes a lamp housing 120, a plurality of lamps 30 mounted in the lamp housing 120, to irradiate light, and side supports 110 respectively mounted to opposite side walls of the lamp housing 120 in the lamp housing 120, to support each lamp 130 at opposite ends of the lamp 130 such that the plurality of lamps 130 can be uniformly spaced apart from one another. The back light unit 100 also includes a diffuser plate 140 made of a transparent material to diffuse light incident from the lamps 130, and a plurality of optical sheets (optical films) 150 for condensing and diffusing light emerging from the diffuser plate 140 before the light is incident to a front side of a display device, to achieve an enhancement in the efficiency of the light.

A reflection sheet or reflection plate 122 for the reflection of light is also mounted in the lamp housing 120, in which the plurality of lamps 130 are mounted. The reflection sheet or reflection plate 122 is made of a material capable of reflecting light. The reflection sheet or reflection plate 122 is formed to correspond to the bottom surface and inclined side surfaces of the lamp housing 120. Accordingly, the reflection sheet or reflection plate 122 reflects light emitted from the lamps 130 toward the diffuser plate 140, thereby enhancing the efficiency of the light. Here, the lamp housing 120 means a bottom chassis of an LCD device.

For each lamp 130, a cold cathode fluorescent lamp is mainly used. Each lamp 30 includes a glass tube, an inert gas contained in the glass tube, and a cathode and an anode respectively mounted to opposite ends of the glass tube. Phosphors are coated over the inner wall surface of the glass tube, in which the inert gas is filled. Light emitted from each lamp 130 mounted in the lamp housing 120 is incident to the diffuser plate 140.

The number of required lamps 130 increases in proportion to the size of the display screen. The conventional back light unit, which has a general configuration, typically requires 14 to 16 lamps where the back light unit is used in a display device having a screen size of 40 to 42 inches. However, the back light unit 100 according to the first embodiment of the present invention can obtain a display quality enhanced over the conventional case, for the same screen size, even when 12 lamps are mounted. In accordance with the first embodiment of the present invention, the lamps 130 are arranged such that the adjacent lamps 130 are spaced apart from each other by a distance "W2 (30 mm±2 mm)".

The diffuser plate 140 diffuses light incident from the lamps 130, and emits the diffused light toward a front side of the display screen, thereby causing the light to exhibit a uniform brightness and a uniform distribution on the overall surface of the display screen.

The diffuser plate 140 has a thickness of 0.5 to 3.0 mm. A scattering material ($SiO_2$ or $TiO_2$) may be coated over a back surface of the diffuser plate 140, in order to scatter the light incident from the lamps 130 to the diffuser plate 140. Also, although not shown, a mountain pattern having a "▲" shape or a lens pattern having a lenticular shape may be formed in the diffuser plate 140, in order to achieve an enhancement in extraction efficiency for the incident light. The light emerging from the diffuser plate 140 is incident to the plurality of optical sheets 150.

When light is incident to the display screen in a direction perpendicular to the display screen, the efficiency of the light increases. To this end, in the back light unit 100 according to the first embodiment of the present invention, three optical sheets 150 having different thicknesses and different optical characteristics are arranged on the diffuser plate 140.

Figure 5:
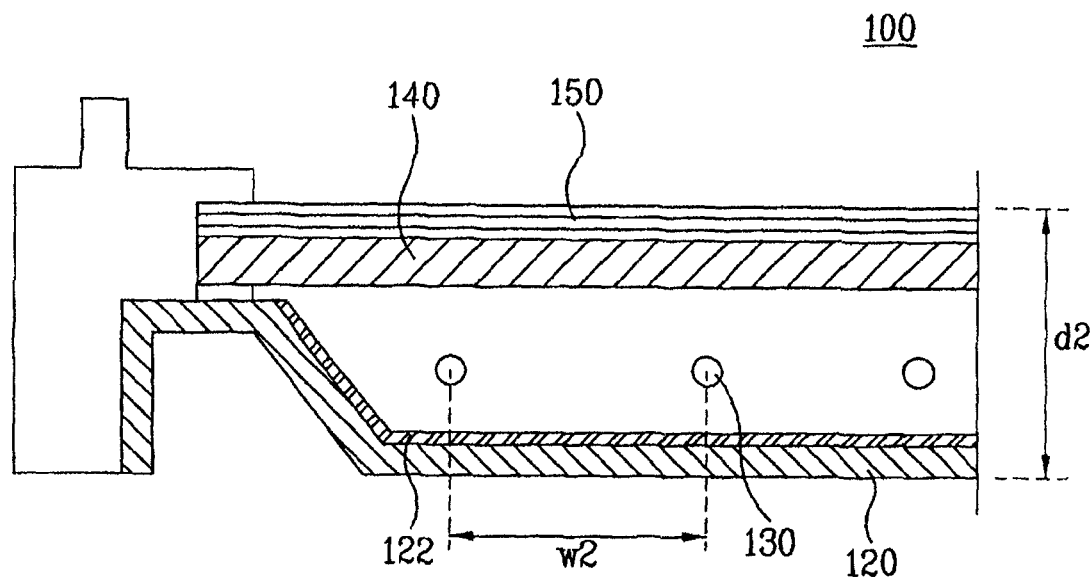
FIG. 5 is a cross-sectional view of the back light unit taken along the line A-A' of FIG. 4.

FIG. 5 is a cross-sectional view of the back light unit taken along the line A-A' of FIG. 4.

Referring to FIG. 5, the optical sheets 150 of the back light unit 100 according to the first embodiment of the present invention comprise three optical sheets having different thicknesses and different optical characteristics, namely, first to third optical sheets 152, 154, and 156.

The first optical sheet 152, which is included in the optical sheets 150, comprises a first condensing sheet (prism sheet). The first prism sheet 152 is laminated over the diffuser plate 140. The first prism sheet 152 condenses light emerging from the diffuser plate 140 in a diffused state, to enhance the efficiency of the light, which will be incident to the display screen.

Figure 6:
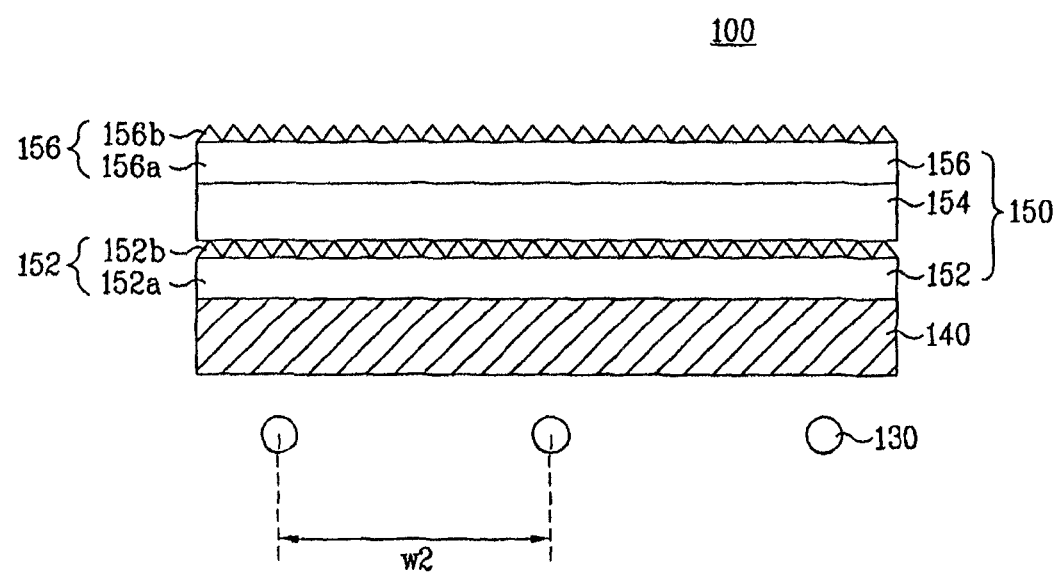
FIG. 6 is an enlarged cross-sectional view partially illustrating the back light unit according to the first embodiment of the present invention.
Figure 7:
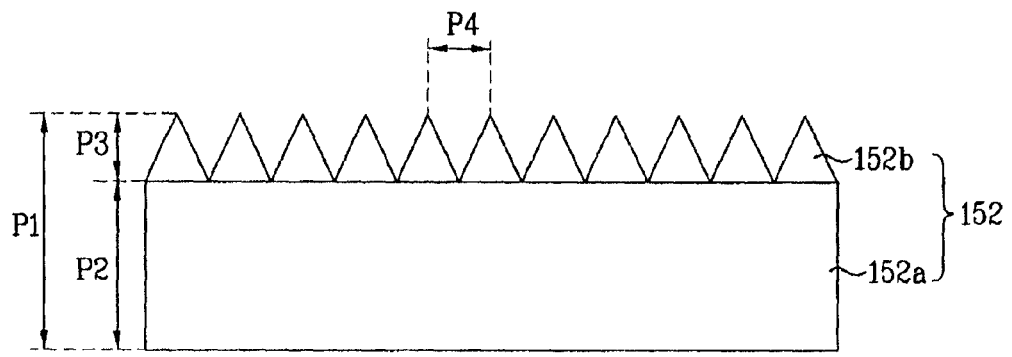
FIGS. 7 and 8 are enlarged cross-sectional views illustrating a first prism sheet shown in FIG. 6.

As shown in FIG. 6, the first prism sheet 152 includes a base film 152a for condensing incident light, and a prism pattern layer 152b having a plurality of "▲"-shaped prism patterns. The "▲"-shaped prism patterns of the prism pattern layer 152b function to enhance the condensing efficiency of the light emerging from the base film 152a. The prism pattern layer 152b is formed to extend in the same direction as the longitudinal direction of the lamps 130. That is, the longitudinal direction of the prism patterns in the prism pattern layer 152b forms an angle of 0° with respect to the longitudinal direction of the lamps 130.

The first prism sheet 152 has a thickness of "P1" (200 to 370 μm). In this case, the base film 152a has a thickness of "P2" (180 to 300 μm), and the prism pattern layer 152b has a thickness of "P3" (20 to 70 μm). The "▲"-shaped prism patterns of the prism pattern layer 152b have a distance of "P4" (10 to 100 μm) between the summits of the adjacent prism patterns.

Typically, for the base film 152a, which is included in the first prism sheet 152, three kinds of standard products respectively having thicknesses of 125, 188, and 250 μm are commercially available. All the three products, which have thicknesses of 125, 188, and 250 μm, respectively, are applicable to the base film 152a of the first prism sheet 152 included in the back light unit 100 according to the first embodiment of the present invention. Preferably, the product having a thickness of 188 μm is applied to the base film 152a in the first embodiment of the present invention.

Figure 8:
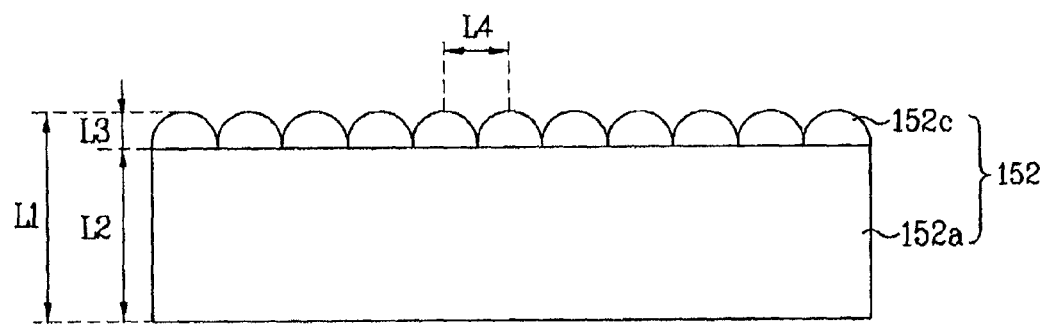

The first prism sheet 152, which is included in the back light unit 100 according to the first embodiment of the present invention, may include prism patterns different from the "▲"-shaped prism patterns. For example, the first prism sheet 152 may include a prism pattern layer 152c having lenticular prism patterns formed on the base film 152a, as shown in FIG. 8.

Where the lenticular prism pattern layer 152c is formed, the first prism sheet 152 has a thickness of "L1" (175 to 350 μm). In this case, the base film 152a has a thickness of "L2" (125 to 250 μm), and the lenticular prism pattern layer 152c has a thickness of "L3" (50 to 100 μm). Each lenticular prism pattern of the lenticular prism pattern layer 152c has a width of "L4" (70 to 200 μm).

The second optical sheet 154, which is included in the optical sheets 150, comprises a diffuser sheet. The diffusion sheet 154 is made of a polyethylene terephthalate (PET) resin or a polymethyl methacrylate (PMMA)-based material. The diffuser sheet 154 is laminated over the first prism sheet 152. The diffuser sheet 154 diffuses light emerging from the first prism sheet 152 in a condensed state, and emits the diffused light toward the display screen.

The third optical sheet 156, which is included in the optical sheets 150, comprises a second condensing sheet (prism sheet). The second prism sheet 156 is laminated over the diffuser sheet 154. The second prism sheet 156 condenses light emerging from the diffuser sheet 154 in a diffused state, to enhance the efficiency of the light, which will be incident to the display screen.

Figure 9:
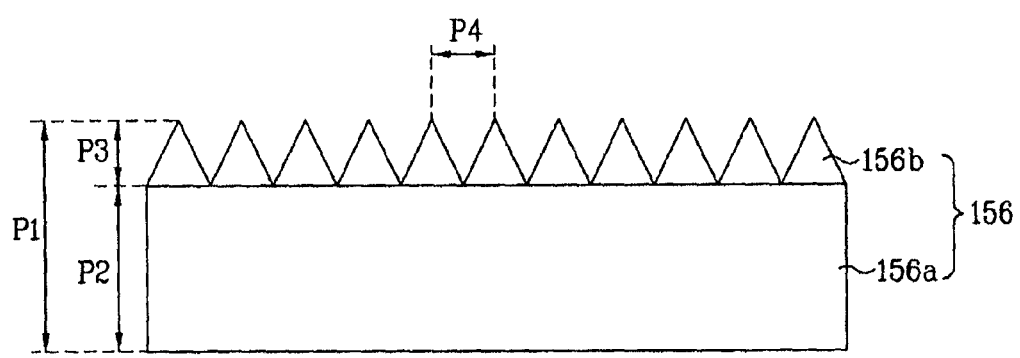
FIGS. 9 and 10 are enlarged cross-sectional views illustrating a second prism sheet shown in FIG. 6.

As shown in FIG. 9, the second prism sheet 156 includes a base film 156a for condensing incident light, and a prism pattern layer 156b having a plurality of "▲"-shaped prism patterns. The "▲"-shaped prism patterns of the prism pattern layer 156b function to enhance the condensing efficiency of the light emerging from the base film 156a. The prism pattern layer 156b is formed to extend in the same direction as the longitudinal direction of the lamps 130. That is, the longitudinal direction of the prism patterns in the prism pattern layer 156b forms an angle of 0° with respect to the longitudinal direction of the lamps 130.

The second prism sheet 156 has a thickness of "P1" (200 to 370 μm). In this case, the base film 156a has a thickness of "P2" (180 to 300 μm), and the prism pattern layer 156b has a thickness of "P3" (20 to 70 μm). The "▲"-shaped prism patterns of the prism pattern layer 156b have a distance of "P4" (10 to 100 μm) between the summits of the adjacent prism patterns.

Typically, for the base film 156a, which is included in the second prism sheet 156, three kinds of standard products respectively having thicknesses of 125, 188, and 250 μm are commercially available. All the three products, which have thicknesses of 125, 188, and 250 μm, respectively, are applicable to the base film 156a of the second prism sheet 156 included in the back light unit 100 according to the first embodiment of the present invention. Preferably, the product having a thickness of 250 μm is applied to the base film 156a in the first embodiment of the present invention.

Figure 10:
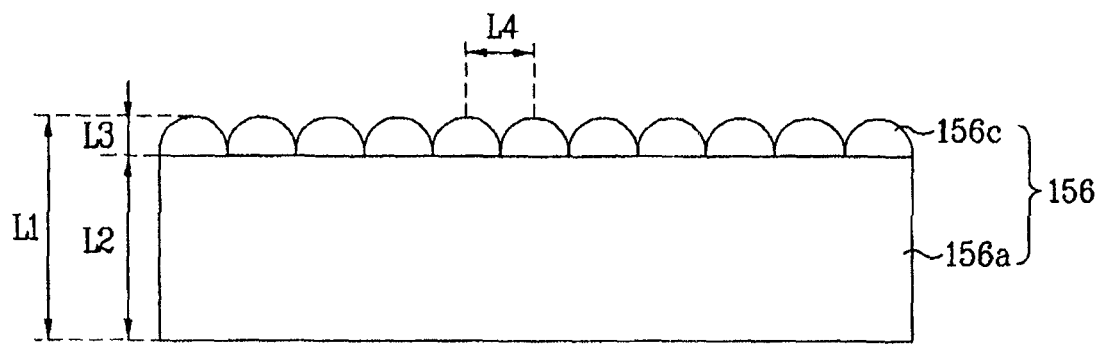

The second prism sheet 156, which is included in the back light unit 100 according to the first embodiment of the present invention, may include prism patterns different from the "▲"-shaped prism patterns. For example, the second prism sheet 156 may include a prism pattern layer 156c having lenticular prism patterns formed on the base film 156a, as shown in FIG. 10.

Where the lenticular prism pattern layer 156c is formed, the second prism sheet 156 has a thickness of "L1" (175 to 350 μm). In this case, the base film 156a has a thickness of "L2" (125 to 250 μm), and the lenticular prism pattern layer 156c has a thickness of "L3" (50 to 100 μm). Each lenticular prism pattern of the lenticular prism pattern layer 156c has a width of "L4" (70 to 200 μm).

In the back light unit 100 according to the first embodiment of the present invention, the first prism sheet 152, diffuser sheet 154, and second prism sheet 156 are sequentially laminated over the diffuser plate 140. In this case, the base film 152a of the first prism sheet 152 has a thickness of 188 μm, and the prism pattern layer 152b of the first prism sheet 152 has a thickness of 25 μm. Also, the base film 156a of the second prism sheet 156 has a thickness of 250 μm, and the prism pattern layer 156b of the second prism sheet 156 has a thickness of 25 μm.

Figure 1:
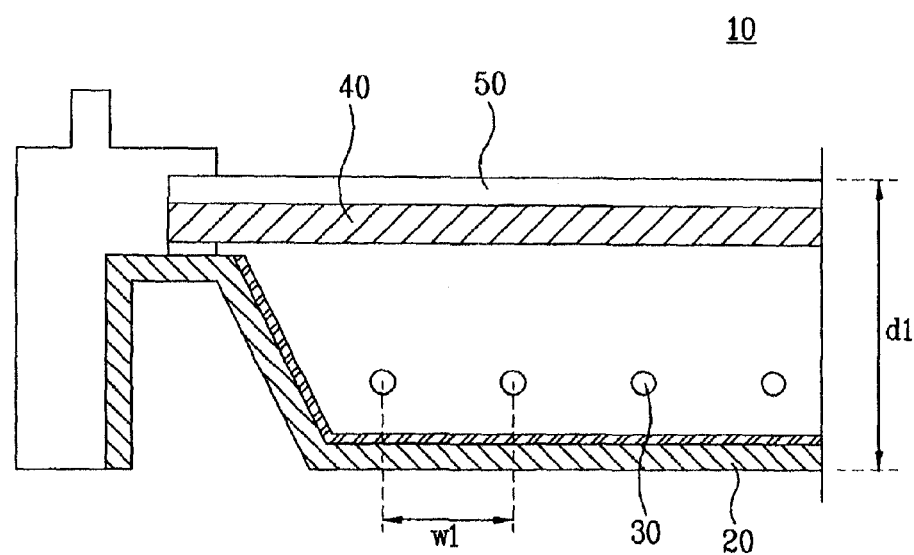
FIG. 1 is a cross-sectional view illustrating a general liquid crystal display (LCD) module using a direct type back light unit.
Figure 2:
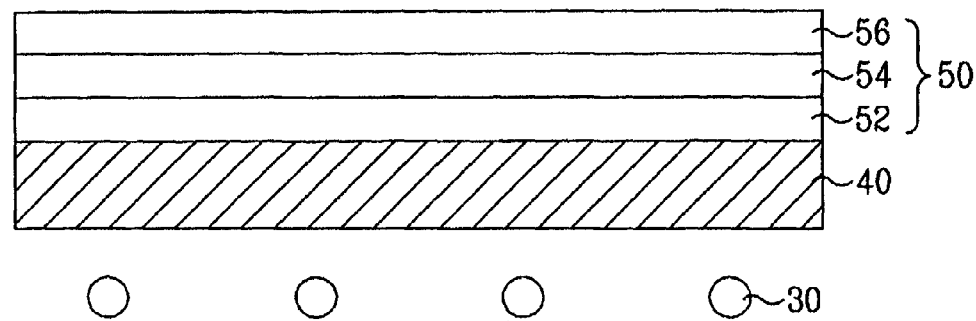
FIG. 2 is an enlarged sectional view of a part of the back light unit shown in FIG. 1.
Figure 3:
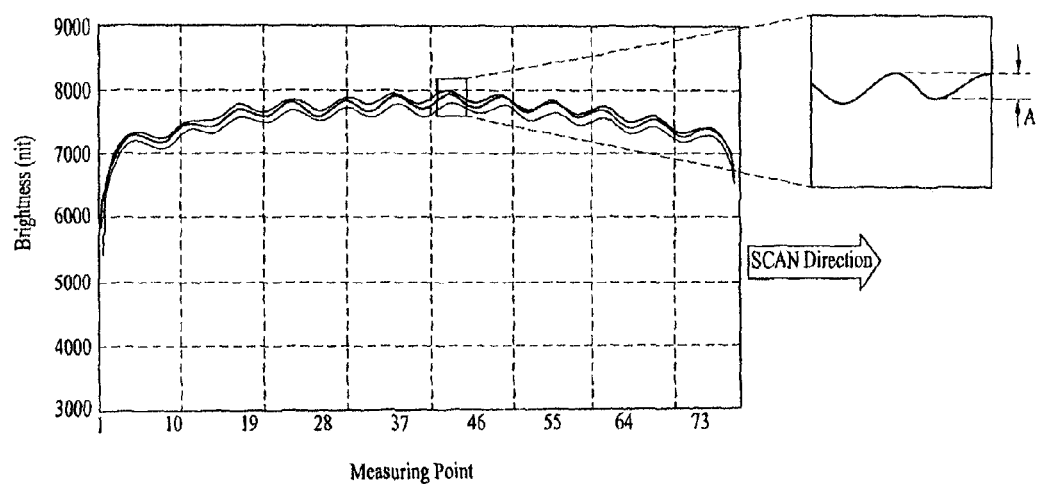
FIG. 3 is a graph depicting the results of a brightness measuring simulation for the LCD module using the back light unit shown in FIG. 1.

In the back light unit 100 according to the first embodiment of the present invention, it is possible to reduce the distance from the lamps 130 to the diffuser plate 140, using the diffuser plate 140 and the three optical sheets sequentially laminated over the diffuser plate 140, namely, the two prism sheets 152 and 156 laminated over the diffuser plate 140 and the diffuser sheet 154 interposed between the two prism sheets 152 and 156, as described above, and thus to reduce the total thickness "d2" (17 mm). Accordingly, it is possible to reduce the thickness of the back light unit by 20 mm, as compared to the thickness of the general back light unit shown in FIG. 1, and thus to reduce the total thickness of the flat panel display device.

Also, the number of lamps mounted in the back light unit 100 according to the first embodiment of the present invention is reduced by 2 to 4, as compared to that of the conventional back light unit. Accordingly, it is possible to reduce the manufacturing costs of the back light unit.

Figure 11:
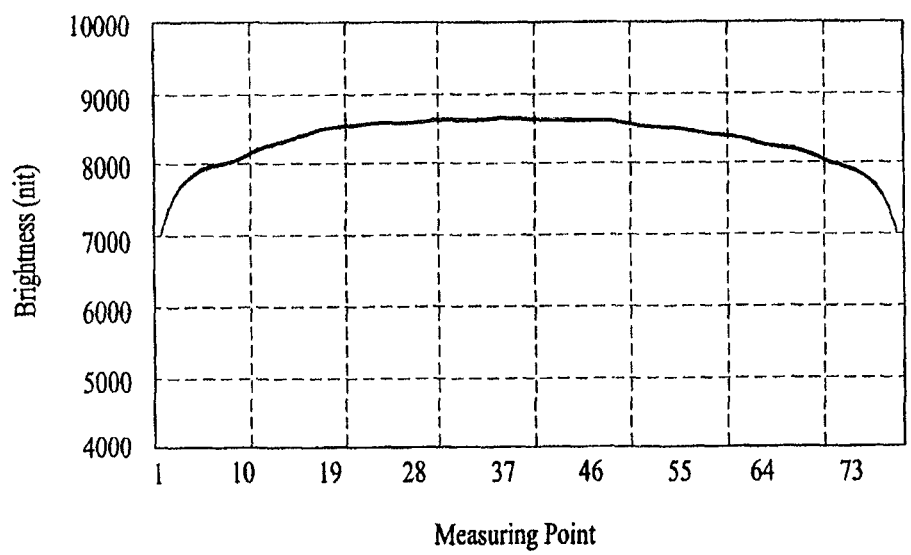
FIG. 11 is a graph depicting the results of a brightness measuring simulation for an LCD module using a back light unit according to an embodiment of the present invention.

Although the thickness and the number of lamps in the back light unit 100 according to the first embodiment of the present invention is reduced by 20 mm and 2 to 4, respectively, as compared to the conventional case, the brightness difference exhibited on the display screen is reduced, as shown in FIG. 11. Accordingly, it is possible to achieve a brightness uniformity, and thus to achieve an enhancement in the display quality of the flat panel display device.

Mode for Invention

Figure 12:
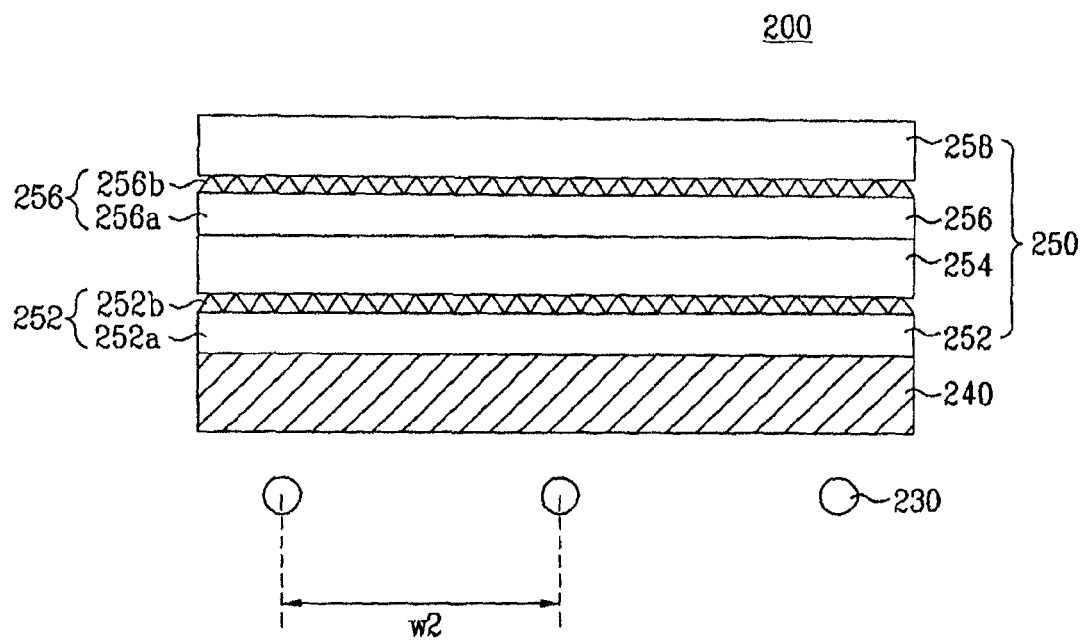
FIG. 12 is an enlarged cross-sectional view partially illustrating a back light unit according to a second embodiment of the present invention.

FIG. 12 is an enlarged cross-sectional view partially illustrating a back light unit according to a second embodiment of the present invention.

The back light unit 200 according to the second embodiment of the present invention has constituent elements identical to those of the back light unit 200 according to the first embodiment of the present invention, except for the configurations of optical sheets laminated over a diffuser plate.

Referring to FIG. 12, the back light unit 200 according to the second embodiment of the present invention includes a diffuser plate 240, and a plurality of optical sheets 250 laminated over the diffuser plate 240. The optical sheets 250 comprise four optical sheets, namely, first to fourth optical sheets 252, 254, 256, and 258.

The first optical sheet 252, which is included in the optical sheets 250, comprises a first condensing sheet (prism sheet). The first prism sheet 252 is laminated over the diffuser plate 240. The first prism sheet 252 condenses light emerging from the diffuser plate 240 in a diffused state, to enhance the efficiency of the light, which will be incident to the display screen.

The first prism sheet 252 have the same configuration and optical characteristics as those of the first prism sheet 152 of the back light unit 200 according to the first embodiment of the present invention.

The prism pattern layer 252b of the first prism sheet 252 is formed to extend in the same direction as the longitudinal direction of lamps 230. That is, the longitudinal direction of the prism patterns in the prism pattern layer 252b forms an angle of 0° with respect to the longitudinal direction of the lamps 230.

The first prism sheet 252 has a thickness of 200 to 370 μm. In this case, the base film 252a has a thickness of 180 to 300 μm, and the prism pattern layer 252b has a thickness of 20 to 70 μm. The "▲"-shaped prism patterns of the prism pattern layer 252b have a distance of 10 to 100 μm between the summits of the adjacent prism patterns.

Three thicknesses of 125, 188, and 250 μm are applicable to the base film 252a of the first prism sheet 252 included in the back light unit 200 according to the second embodiment of the present invention. Preferably, the thickness of 188 μm is applied to the base film 252a in the second embodiment of the present invention.

The first prism sheet 252, which is included in the back light unit 200 according to the second embodiment of the present invention, may include prism patterns different from the "▲"-shaped prism patterns. For example, the first prism sheet 252 may include a prism pattern layer having lenticular prism patterns formed on the base film 252a, as shown in FIG. 8.

Where the lenticular prism pattern layer is formed, the first prism sheet 252 has a thickness of 175 to 350 μm. In this case, the base film 252a has a thickness of 125 to 250 μm, and the lenticular prism pattern layer has a thickness of 50 to 100 μm. Each lenticular prism pattern of the lenticular prism pattern layer has a width of 70 to 200 μm.

The second optical sheet 254, which is included in the optical sheets 250, comprises a first diffuser sheet. The first diffuser sheet 254 is laminated over the first prism sheet 252. The first diffuser sheet 254 diffuses light emerging from the first prism sheet 252 in a condensed state, and emits the diffused light toward the display screen.

The third optical sheet 256, which is included in the optical sheets 250, comprises a second condensing sheet (prism sheet). The second prism sheet 256 is laminated over the first diffuser sheet 254. The second prism sheet 256 condenses light emerging from the first diffuser sheet 254 in a diffused state, to enhance the efficiency of the light, which will be incident to the display screen.

The second prism sheet 256 has the same configuration and optical characteristics as those of the second prism sheet 156 of the back light unit 100 according to the first embodiment of the present invention. The prism pattern layer 256b is formed to extend in the same direction as the longitudinal direction of the lamps 230. That is, the longitudinal direction of the prism patterns in the prism pattern layer 256b forms an angle of 0° with respect to the longitudinal direction of the lamps 230.

The second prism sheet 256 has a thickness of 200 to 370 μm. In this case, the base film 256a has a thickness of 180 to 300 μm, and the prism pattern layer 256b has a thickness of 20 to 70 μm. The "▲"-shaped prism patterns of the prism pattern layer 256b have a distance of 10 to 100 μm between the summits of the adjacent prism patterns.

Three thicknesses of 125, 188, and 250 μm are applicable to the base film 256a of the second prism sheet 256 included in the back light unit 200 according to the second embodiment of the present invention. Preferably, the thickness of 250 μm is applied to the base film 256a in the second embodiment of the present invention.

The second prism sheet 256, which is included in the back light unit 200 according to the second embodiment of the present invention, may include prism patterns different from the "▲"-shaped prism patterns. For example, the second prism sheet 256 may include a prism pattern layer having lenticular prism patterns formed on the base film 256a, as shown in FIG. 10.

Where the lenticular prism pattern layer is formed, the second prism sheet 256 has a thickness of 175 to 350 μm. In this case, the base film 256a has a thickness of 125 to 250 μm, and the lenticular prism pattern layer has a thickness of 50 to 100 μm. Each lenticular prism pattern of the lenticular prism pattern layer has a width of 70 to 200 μm.

The fourth optical sheet 258, which is included in the optical sheets 250, comprises a second diffuser sheet. The second diffuser sheet 258 is laminated over the second prism sheet 256. The second diffuser sheet 258 diffuses light emerging from the second prism sheet 256 in a condensed state, and emits the diffused light toward the display screen.

In the back light unit 200 having the above-described configuration according to the second embodiment of the present invention, the first prism sheet 252, first diffuser sheet 254, second prism sheet 256, and second diffuser sheet 258 are sequentially laminated over the diffuser plate 240.

In this case, the base film 252a of the first prism sheet 252 has a thickness of 188 μm, and the prism pattern layer 252b of the first prism sheet 252 has a thickness of 25 μm. Also, the base film 256a of the second prism sheet 256 has a thickness of 250 μm, and the prism pattern layer 256b of the second prism sheet 256 has a thickness of 25 μm.

In the back light unit 200 according to the second embodiment of the present invention, it is possible to reduce the distance from the lamps 230 to the diffuser plate 240, using the diffuser plate 240 and the four optical sheets 252, 254, 256, and 258 sequentially laminated over the diffuser plate 240, as described above, and thus to reduce the total thickness of the back light unit 200 (17 mm). Accordingly, it is possible to reduce the thickness of the back light unit by 20 mm, as compared to the thickness of the general back light unit shown in FIG. 1, and thus to reduce the total thickness of the flat panel display device.

Also, the number of lamps mounted in the back light unit 200 according to the second embodiment of the present invention is reduced by 2 to 4, as compared to that of the conventional back light unit. Accordingly, it is possible to reduce the manufacturing costs of the back light unit.

Although the thickness and the number of lamps in the back light unit 200 according to the second embodiment of the present invention is reduced by 20 mm and 2 to 4, respectively, as compared to the conventional case, the brightness difference exhibited on the display screen is reduced, as shown in FIG. 11. Accordingly, it is possible to achieve a brightness uniformity, and thus to achieve an enhancement in the display quality of the flat panel display device.

Figure 13:
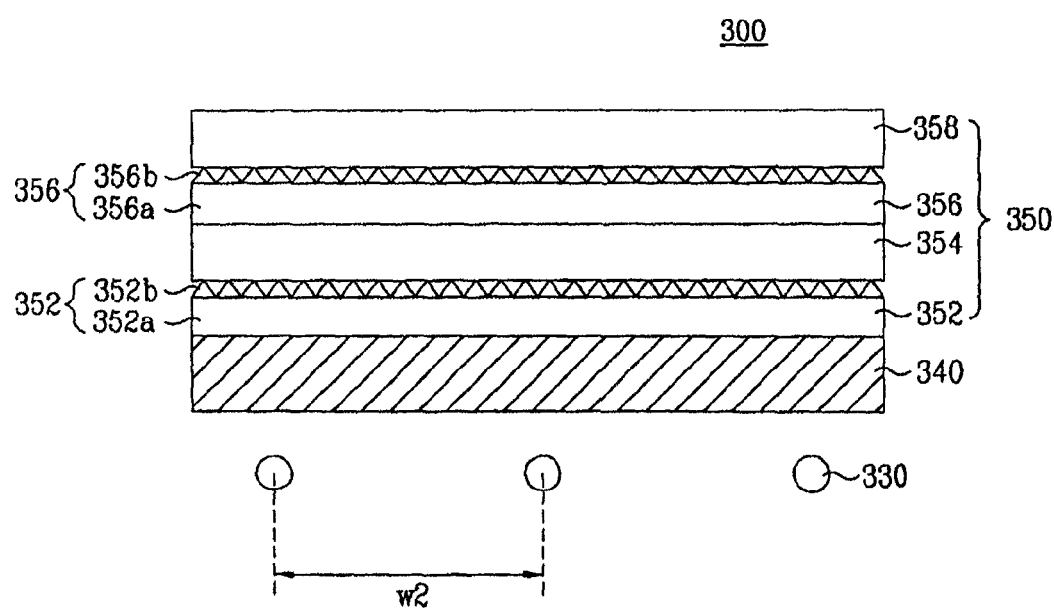
FIG. 13 is an enlarged cross-sectional view partially illustrating a back light unit according to a third embodiment of the present invention.

FIG. 13 is an enlarged cross-sectional view partially illustrating a back light unit according to a third embodiment of the present invention.

The back light unit 300 according to the third embodiment of the present invention has constituent elements identical to those of the back light units 100 and 200 according to the first and second embodiment of the present invention, except for the configurations of optical sheets laminated over a diffuser plate.

Figure 14:
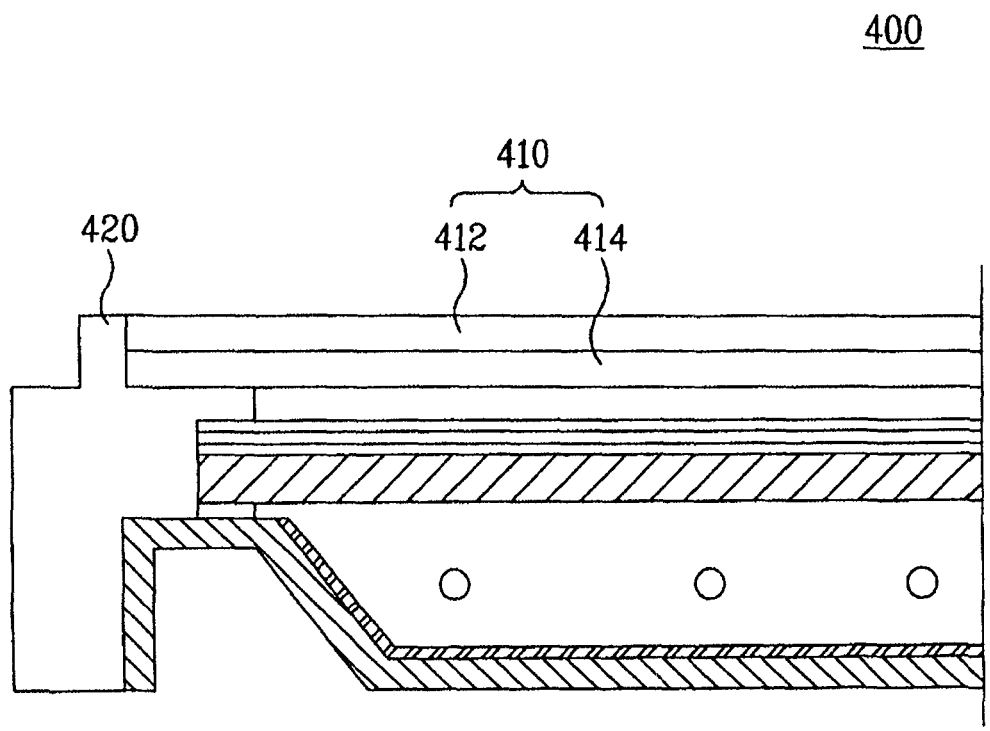
FIG. 14 is a cross-sectional view illustrating an LCD module using a back light unit according to an embodiment of the present invention.

Referring to FIG. 14, the back light unit 300 according to the third embodiment of the present invention includes a diffuser plate 340, and a plurality of optical sheets 350 laminated over the diffuser plate 340. The optical sheets 350 comprise four optical sheets, namely, first to fourth optical sheets 352, 354, 356, and 358.

The first optical sheet 352, which is included in the optical sheets 350, comprises a first condensing sheet (prism sheet). The first prism sheet 352 is laminated over the diffuser plate 340. The first prism sheet 352 condenses light emerging from the diffuser plate 340 in a diffused state, to enhance the efficiency of the light, which will be incident to the display screen.

The first prism sheet 352 have the same configuration and optical characteristics as those of the first prism sheet 152 of the back light unit 100 according to the first embodiment of the present invention.

The prism pattern layer 352b of the first prism sheet 352 is formed to extend in the same direction as the longitudinal direction of lamps 330. That is, the longitudinal direction of the prism patterns in the prism pattern layer 352b forms an angle of 0° with respect to the longitudinal direction of the lamps 330.

The first prism sheet 352 has a thickness of 200 to 370 μm. In this case, the base film 352a has a thickness of 180 to 300 μm, and the prism pattern layer 352b has a thickness of 20 to 70 μm. The "▲"-shaped prism patterns of the prism pattern layer 352b have a distance of 10 to 100 μm between the summits of the adjacent prism patterns.

Three thicknesses of 125, 188, and 250 μm are applicable to the base film 352a of the first prism sheet 352 included in the back light unit 300 according to the third embodiment of the present invention. Preferably, the thickness of 188 μm is applied to the base film 352a in the third embodiment of the present invention.

The first prism sheet 352, which is included in the back light unit 300 according to the third embodiment of the present invention, may include prism patterns different from the "▲"-shaped prism patterns. For example, the first prism sheet 352 may include a prism pattern layer having lenticular prism patterns formed on the base film 352a, as shown in FIG. 8.

Where the lenticular prism pattern layer is formed, the first prism sheet 352 has a thickness of 175 to 350 μm. In this case, the base film 352a has a thickness of 135 to 250 μm, and the lenticular prism pattern layer has a thickness of 50 to 100 μm. Each lenticular prism pattern of the lenticular prism pattern layer has a width of 70 to 200 μm.

The second optical sheet 354, which is included in the optical sheets 350, comprises a diffuser sheet. The diffuser sheet 354 is laminated over the first prism sheet 352. The diffuser sheet 354 diffuses light emerging from the first prism sheet 352 in a condensed state, and emits the diffused light toward the display screen.

The third optical sheet 356, which is included in the optical sheets 350, comprises a second condensing sheet (prism sheet). The second prism sheet 356 is laminated over the diffuser sheet 354. The second prism sheet 356 condenses light emerging from the diffuser sheet 354 in a diffused state, to enhance the efficiency of the light, which will be incident to the display screen.

The second prism sheet 356 has the same configuration and optical characteristics as those of the second prism sheet 156 of the back light unit 100 according to the first embodiment of the present invention. The prism pattern layer 356b is formed to extend in the same direction as the longitudinal direction of the lamps 330. That is, the longitudinal direction of the prism patterns in the prism pattern layer 356b forms an angle of 0° with respect to the longitudinal direction of the lamps 330.

The second prism sheet 356 has a thickness of 200 to 370 μm. In this case, the base film 356a has a thickness of 180 to 300 μm, and the prism pattern layer 356b has a thickness of 20 to 70 μm. The "▲"-shaped prism patterns of the prism pattern layer 356b have a distance of 10 to 100 μm between the summits of the adjacent prism patterns.

Three thicknesses of 135, 188, and 350 μm are applicable to the base film 356a of the second prism sheet 356 included in the back light unit 300 according to the third embodiment of the present invention. Preferably, the thickness of 350 μm is applied to the base film 356a in the third embodiment of the present invention.

The second prism sheet 356, which is included in the back light unit 300 according to the third embodiment of the present invention, may include prism patterns different from the "▲"-shaped prism patterns. For example, the second prism sheet 356 may include a prism pattern layer having lenticular prism patterns formed on the base film 356a, as shown in FIG. 10.

Where the lenticular prism pattern layer is formed, the second prism sheet 356 has a thickness of 175 to 350 μm. In this case, the base film 356a has a thickness of 125 to 250 μm, and the lenticular prism pattern layer has a thickness of 50 to 100 μm. Each lenticular prism pattern of the lenticular prism pattern layer has a width of 70 to 200 μm.

The fourth optical sheet 358, which is included in the optical sheets 350, comprises a reflective polarizing sheet, to selectively polarize the light re-condensed by the second prism sheet 356. The reflective polarizing sheet 358 is laminated over the second prism sheet 356. The reflective polarizing sheet 358 selectively polarizes light emerging from the second prism sheet 356 in a condensed state, and emits the polarized light toward the display screen.

In the back light unit 300 having the above-described configuration according to the third embodiment of the present invention, the first prism sheet 352, diffuser sheet 354, second prism sheet 356, and reflective polarizing sheet 358 are sequentially laminated over the diffuser plate 340.

In this case, the base film 352a of the first prism sheet 352 has a thickness of 188 μm, and the prism pattern layer 352b of the first prism sheet 352 has a thickness of 35 μm. Also, the base film 356a of the second prism sheet 356 has a thickness of 250 μm, and the prism pattern layer 356b of the second prism sheet 356 has a thickness of 25 μm.

In the back light unit 300 according to the third embodiment of the present invention, it is possible to reduce the distance from the lamps 330 to the diffuser plate 340, using the diffuser plate 340 and the four optical sheets 352, 354, 356, and 358 sequentially laminated over the diffuser plate 340, as described above, and thus to reduce the total thickness of the back light unit 300 to 17 mm. Accordingly, it is possible to reduce the thickness of the back light unit by 20 mm, as compared to the thickness of the general back light unit shown in FIG. 1, and thus to reduce the total thickness of the flat panel display device.

Also, the number of lamps mounted in the back light unit 300 according to the third embodiment of the present invention is reduced by 2 to 4, as compared to that of the conventional back light unit. Accordingly, it is possible to reduce the manufacturing costs of the back light unit.

Although the thickness and the number of lamps in the back light unit 300 according to the third embodiment of the present invention is reduced by 20 mm and 2 to 4, respectively, as compared to the conventional case, the brightness difference exhibited on the display screen is reduced, as shown in FIG. 11. Accordingly, it is possible to achieve a brightness uniformity, and thus to achieve an enhancement in the display quality of the flat panel display device.

FIG. 14 is a cross-sectional view illustrating an LCD module, to which the back light unit according to an embodiment of the present invention is applied.

Referring to FIG. 14, the LCD module 400 includes a liquid crystal panel 410 having liquid crystal cells (not shown) arranged in the form of a matrix between two glass substrates 412 and 414, a back light unit for irradiating light to the liquid crystal panel 410, and a panel guard 420 for supporting the liquid crystal panel 410 such that the liquid crystal panel 410 is seated on the panel guard 420, and enclosing the back light unit.

In the LCD module 400, a plurality of optical sheets are arranged to change the travel direction of light traveling from the back light unit toward the liquid crystal panel 410 such that the light is directed in a direction perpendicular to the liquid crystal panel 410. The constituent elements of the LCD module 400 should be coupled together to form an integrated structure, in order to avoid optical loss. The LCD module 400 should also be protected from a damage caused by an external impact.

To this end, a case for the LCD device, which is formed to enclose the periphery of the liquid crystal panel and the back light unit, is provided.

The liquid crystal panel 410 includes upper and lower substrates 412 and 414, between which liquid crystals are filled, and spacers (not shown) for maintaining the upper and lower substrates 412 in a spaced state. Although not shown, color filters, common electrodes, a black matrix are formed on the upper substrate 412 of the liquid crystal panel 410. Although not shown, signal lines such as data lines and gate lines are formed on the lower substrate 414 of the liquid crystal panel 410. Thin film transistors (TFTs) are formed at respective intersections of the data lines and gate lines. In response to a scan signal (gate driving signal) from one gate line, the corresponding TFT supplies an analog video signal from the corresponding line to a liquid crystal cell.

Pixel electrodes are formed in pixel regions defined between the data lines and the gate lines, respectively. At one lateral end of the lower substrate 414, pad regions are formed. The data lines and gate lines are connected to the pad regions. Although not shown, a tape carrier package (TCP) is attached to each pad region. A driver IC is mounted to the TCP, to apply a drive signal to the corresponding TFTs. The TCP supplies a data signal from the drive IC to the corresponding data lines, and supplies a scan signal from the drive IC to the corresponding gate lines. An upper polarizing sheet is attached to the upper substrate 412 of the liquid crystal panel 410. A lower polarizing sheet is attached to a back surface of the lower substrate 414.

As described above, the LCD module 400 according to the illustrated embodiment of the present invention includes the liquid crystal panel 410, and the back light unit for irradiating light to the liquid crystal panel 410. In this case, for the back light unit, which irradiates light to the liquid crystal panel 410, one of the back light units according to the first to third embodiments of the present invention is usable.

The LCD module 400 having the above-described configuration can display an image through the liquid crystal panel 410 by controlling the transmittance of light irradiated from the back light unit.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention, which relates to a back light unit and an LCD module using the same, not only can reduce the thickness of the LCD module, using the back light unit according to the embodiment of the present invention, but also can reduce the manufacturing costs. The present invention can also achieve an enhancement in the display quality of the LCD device, using the back light unit according to the embodiment of the present invention.

The invention claimed is:

1. A back light unit comprising:
 a diffuser plate configured to diffuse light from a plurality of light source units positioned under the diffuser plate;
 a plurality of condensers disposed on the diffuser plate; and
 a diffuser interposed between at least two of the plurality of condensers;
 wherein each of the plurality of condensers includes:
  a base film having a same thickness; and
  a plurality of condensing patterns formed on the base film; and
 wherein a first of the at least two of the plurality of condensers, the diffuser, and a second of the at least two of the plurality of condensers are sequentially laminated on the diffuser plate;
 wherein the plurality of light source units are arranged in a first longitudinal direction parallel to each other; and
 wherein the plurality of condensing patterns extend in the first longitudinal direction.

2. The back light unit of claim 1, wherein each of the plurality of condensers comprises a thickness of about 200 to about 370 μm.

3. The back light unit of claim 2, wherein the base film of one of the plurality of condensers comprises a thickness of about 190 μm.

4. The back light unit of claim 3, wherein each of the condensing patterns has a cross-sectional shape of a triangle shape or a lenticular shape having a predetermined curvature.

5. The back light unit of claim 4, wherein the condensing patterns comprise a thickness of about 20 μ to about 100 μm.

6. The back light unit of claim 5, wherein the plurality of condensers and the plurality of diffusers are formed as an integrated film.

7. A back light unit comprising:
 a diffuser plate configured to diffuse light from a plurality of light source units positioned beneath the diffuser plate;
 a first condenser including first condensing patterns and a first base film having a first thickness;
 a second condenser including second condensing patterns and a second base film having the first thickness; and
 a first diffuser sheet disposed between the first condenser and the second condenser;
 wherein the first condenser, the first diffuser sheet, and the second condenser are sequentially laminated on the diffuser plate;
 wherein each of the plurality of light source units are arranged in a first longitudinal direction parallel to each other; and
 wherein the first condensing patterns and the second condensing patterns are formed to extend in a the first longitudinal direction substantially parallel to the plurality of light source units.

8. The back light unit of claim 7, further comprising:
 a second diffuser sheet disposed on the second condenser.

9. A back light unit comprising:
 a diffuser plate configured to diffuse light from a plurality of light source units arranged in parallel under the diffuser plate;
 a first condenser including a first pattern and a first base film with a first thickness, wherein the first condenser is configured to condense the diffused light from the diffuser plate to form a first condensed light;
 a first diffuser configured to diffuse the first condensed light from the first condenser to form a first diffused light;
 a second condenser including a second pattern and a second base film with the first thickness, wherein the second condenser is configured to condense the first diffused light from the first diffuser to form a second condensed light; and
 a second diffuser configured to diffuse the second condensed light from the second condenser;
 wherein the first condenser, the first diffuser sheet, the second condenser, and the second diffuser are sequentially laminated on the diffuser plate;

wherein each of the plurality of light source units are arranged in a first longitudinal direction parallel to each other; and wherein the first condensing pattern and the second condensing pattern extend in the first longitudinal direction substantially parallel to the plurality of light source units.

10. A back light unit comprising:

a diffuser plate configured to diffuse light from a plurality of light source units positioned under the diffuser plate to form a diffused light;

a first condenser including first patterns and a first base film, wherein the first condenser is configured to condense the diffused light from the diffuser plate to form a first condensed light;

a diffuser sheet configured to diffuse the first condensed light from the first condenser;

a second condenser including second patterns and a second base film having a same thickness as the first base film, wherein the second condenser is configured to condense the light from the diffuser sheet to form a second condensed light; and a reflective polarizer configured to selectively polarize the second condensed light from the second condenser;

wherein the first condenser, the diffuser sheet, the second condenser, and the reflective polarizer are sequentially laminated on the diffuser plate;

wherein each of the plurality of light source units are arranged in a first longitudinal direction parallel to each other; and wherein the first patterns and the second patterns extend in the first longitudinal direction parallel to the plurality of light source units.

11. An optical sheet unit comprising;

a diffuser plate configured to diffuse light;

a first condenser configured to condense the diffused light from the diffuser plate;

a first diffuser configured to diffuse the condensed light from the first condenser;

a second condenser configured to condense the diffused light from the first diffuser; and a second diffuser disposed on the second condenser, wherein the second is configured to diffuse the condensed light from the second condenser;

wherein the first condenser includes a first pattern and a first base film;

wherein the second condenser includes a second pattern and a second base film with a same thickness as a thickness of the first base film;

wherein the first condenser, the first diffuser, the second condenser, and the second diffuser are sequentially laminated to the diffuser plate; and wherein the first pattern and the second pattern extend in a direction longitudinal to a direction of a plurality of sources configured to the provide the light.

12. The optical sheet unit of claim 11, wherein the condensing patterns comprise a thickness of about 20 μm to about 100 μm.

* * * * *